United States Patent Office 2,988,331
Patented June 13, 1961

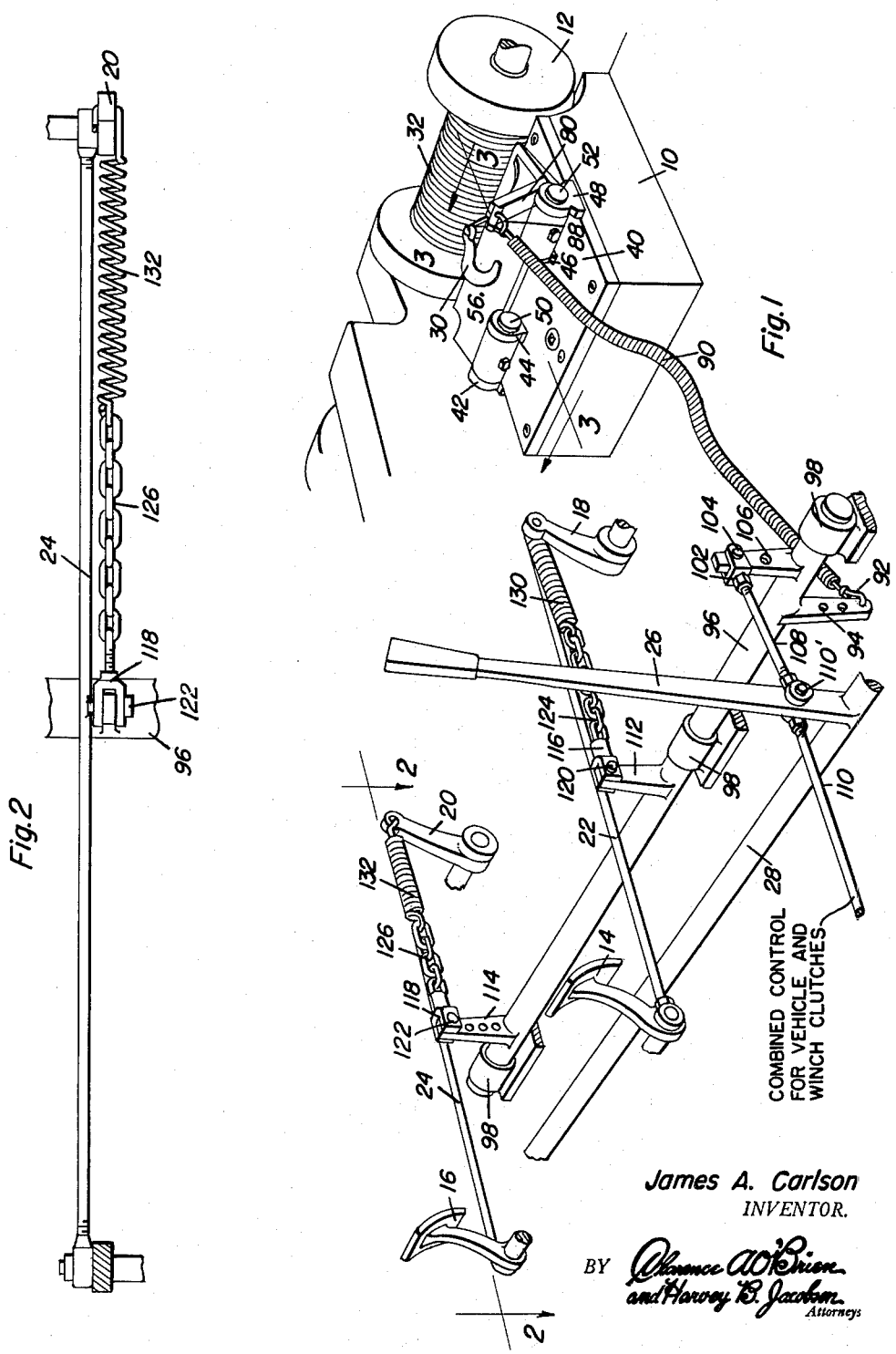

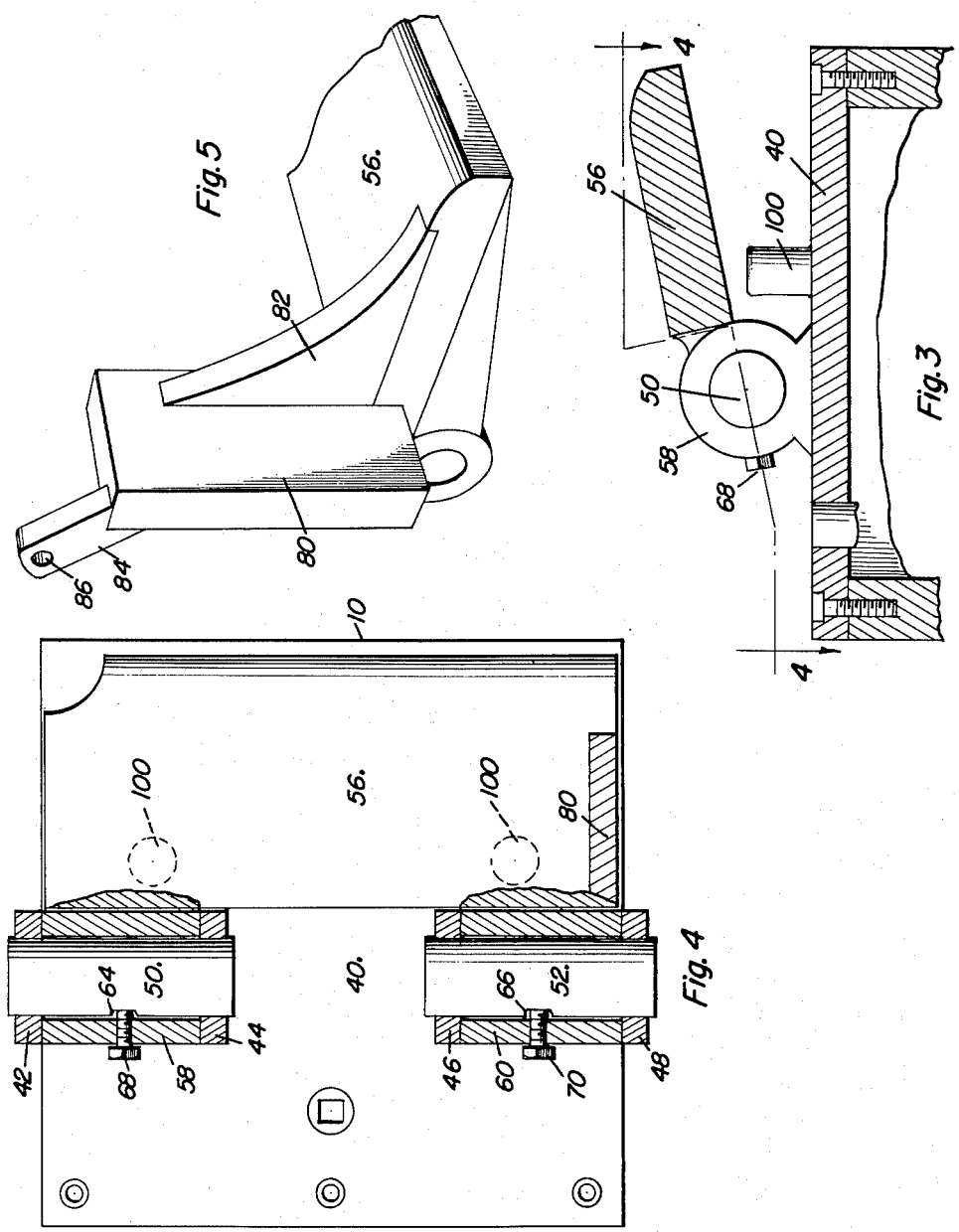

2,988,331
WINCH SAFETY DEVICE
James A. Carlson, Rte. 1, Box 264, Astoria, Oreg.
Filed Sept. 23, 1957, Ser. No. 685,582
2 Claims. (Cl. 254—173)

This invention relates to a winch safety device and more particularly to a device for stopping a hook or shackle on a towing winch as used in logging, contracting and other heavy construction work from breaking or springing the case of a towing winch mounted on a tractor.

The primary object of the present invention resides in the provision of means for actuating the clutch lever and brake arm of a tractor so as to stop the tractor and disengage the winch to prevent the hoop or shackle of the towing winch from breaking or springing the winch case of the winch on the tractor.

After a tractor operator subsequent to dropping a load continues ahead with the tractor in gear thus bringing the winch hook around and into the winch case, there may be considerable damage done to the gears, shaft or shifting fork mounted in the winch case. It is the concept of the present invention to provide a pressure plate mounted on the winch case which when the pressure plate is pulled down on the case due to action of the hook or shackle the clutch lever and the brake arm will be actuated thus safely bringing the tractor to a stop or disengaging the winch.

These, together with the various ancillary objects and features of the invention which will become apparent as the following description proceeds, are attained by this winch safety device, a preferred embodiment of which has been illustrated in the accompanying drawings, by way of example, wherein:

FIGURE 1 is a diagrammatic perspective view of the winch safety device comprising the present invention;

FIGURE 2 is an enlarged horizontal view as taken along the plane of line 2—2 of FIGURE 1;

FIGURE 3 is an enlarged vertical sectional view as taken along the plane of line 3—3 of FIGURE 1 illustrating the relative position of the pressure plate;

FIGURE 4 is a horizontal sectional detail view as taken along the plane of line 4—4 in FIGURE 3 further illustrating the construction of the pressure plate; and FIGURE 5 is a partial perspective view of the pressure plate and its associated bracket.

The safety device of this invention is designed for and is to be understood as applied to a conventional type of logging tractor having a power operated winch mounted thereon and in which the vehicle clutch and the customary winch clutch may be simultaneously controlled through a single combined control lever to thereby initiate or stop joint operation of the tractor and of the winch, it being understood that there is also provided the usual manual control of the winch clutch so as to disengage the winch from the power plant of the tractor. Inasmuch as the details of this arrangement are conventional and are well understood by those versed in this art and since the safety device of the present invention is in no way concered with the operation of these conventional controls, a further description of the same is deemed to be unnecessary.

With continuing reference to the accompanying drawings wherein like reference numerals designate similar parts throughout the various views, reference numeral 10 generally designates the winch case of a winch 12 adapted to be mounted on any suitable tractor provided with brake operation pedals as at 14 and 16 which normally serve to actuate the brake arms 18 and 20 to which they are connected by connecting rods 22 and 24 together with a clutch lever 26 adapted to actuate through a shaft 28 the clutch of the tractor. Winch 12 operates to draw the hook 30 thereon on the drum of the winch when the cable 32 is wound. Cable 32 will be wound on the drum being drawn from the right side of the drum and across the top of the drum when the tractor is engaged and in operation together with the clutch lever 26.

The concept of the invention resides in providing means for preventing the hook 30 from engaging and battering the case 10 if the operator of a tractor fails to disengage the clutch lever 26 and hence the winch 12 when continuing to operate the tractor. Incorporated in the invention is a mounting plate 40 which carries journals 42, 44, 46 and 48 for a pair of shafts 50 and 52 between which the hook 30 can pass.

As can be seen best in FIGURES 3 and 4, a pressure plate 56 is provided which pressure plate 56 includes a pair of sleeves 58 and 60 which are adapted to be engaged about the shafts 50 and 52 it being noted that the shafts 50 and 52 are freely rotatable within the journals and movable axially with respect thereto. The shafts 50 and 52 have recesses 64 and 66 therein for reception of lock screws 68 and 70 which are threadedly engaged in the sleeves 58 and 60 and extend into the recesses 64 and 66 lockingly holding the pressure plate 56 on the shafts 50 and 52. The pressure plate 56 has preferably integrally formed therewith a bracket 80 having a reenforcing rib 82 integrally formed therewith together with an attaching lug 84 integral with the bracket 80 which has an aperture 86 therethrough for receiving an eye 88 to which a link 90 is adapted to be attached. The link 90 is preferably in the form of a flexible cable provided with a metallic sheath and is connected at the other end thereof through an eye 92 to a crank arm 94 mounted on a crankshaft 96 suitably journalled in journals 98 attached to the tractor. Positioned below the pressure plate are stops 100 for limiting the lowermost position of the pressure plate 56. As the pressure plate 56 is pulled down due to the action of the hook 30, it will cause the cable 90 to pull on the crank arm 94 thus actuating the crankshaft 96. Connected to the crankshaft by means of a bifurcated member 102 pivoted as at 104 to a crank arm 106 on the shaft 96 is a link 108 which is pivoted as 110' to the lever 26 which actuates the clutch shaft 28 and in turn actuates connecting rod 110 which functions to control the winch and tractor. Further, rotation of the shaft 96 will serve to actuate crank arms 112 and 114 to which bifurcated members 116, 118 are pivoted as at 120 and 122 these bifurcated members having chains 124 and 126 connected thereto which chains have secured at the ends thereof coil springs 130 and 132 which are connected to the brake arms 18 and 20.

In operation, when the hook 30 comes into contact with the pressure plate, it will function to pivot the pressure plate downwardly thus pulling on the link 90 and rotating the shaft 96 causing the clutch and brake elements of the tractor to function thus disengaging the winch 12 and preventing damage to the case 10 and the important elements of the winch contained therein.

What is claimed as new is as follows:

1. For use with a tractor of the type having a winch mounted thereon and a cable wound upon said winch with a cable hook attached to said cable, separate clutches for driving said tractor and winch, brakes on said tractor with brake arms connected to said brakes, driving means on said tractor connected to said clutches and a combined control lever on said tractor connected to said brake arms and said clutches for simultaneously applying said brakes and disengaging the driving means from said vehicle and winch clutches; a safety device comprising a mounting plate, means for securing said mounting plate to said tractor adjacent said winch, a pair of axially spaced coaxial shafts mounted on said plate with their axis parallel to the axis of said winch, a pressure plate disposed above said mounting plate between the axes of said shafts and of said winch, a pair of axially disposed sleeves provided at one edge of said pressure plate and mounted on the respective shafts whereby the pressure plate may be raised and depressed about the axis of said shafts, said cable passing over the winch and through the space between the pressure plate and winch whereby said hook may be engaged with and depress said pressure plate when said cable is wound upon said winch to a predetermined extent, means operatively connecting said pressure plate to said combined control lever to move the latter to its brake setting and de-clutching position when said pressure plate is depressed by said hook.

2. The combination of claim 1 wherein said connecting means includes an upstanding bracket on said pressure plate, an elongated flexible element having one end connected to said bracket and means for connecting the other end of said flexible element to said combined control lever.

References Cited in the file of this patent

UNITED STATES PATENTS

| | | |
|---|---|---|
| 1,699,175 | Yarn | Jan. 15, 1929 |
| 1,893,564 | Robb | Jan. 10, 1933 |
| 1,927,209 | Gilmore | Sept. 19, 1933 |
| 2,080,196 | Bowen | May 11, 1937 |
| 2,081,254 | Shelor | May 25, 1937 |
| 2,086,941 | Macauley | July 13, 1937 |
| 2,120,637 | Van Doorne | June 14, 1938 |
| 2,241,274 | Severson | May 6, 1941 |
| 2,612,059 | Allen et al. | Sept. 30, 1952 |
| 2,790,522 | Senkowski et al. | Apr. 30, 1957 |
| 2,807,341 | Deans | Sept. 24, 1957 |
| 2,813,434 | Stuebs | Nov. 19, 1957 |

FOREIGN PATENTS

| | | |
|---|---|---|
| 604,387 | Great Britain | Oct. 19, 1934 |